(12) United States Patent
Chin et al.

(10) Patent No.: US 12,555,407 B2
(45) Date of Patent: Feb. 17, 2026

(54) VITAL SIGNS MONITORING METHOD, DEVICES RELATED THERETO AND COMPUTER-READABLE STORAGE MEDIUM

(71) Applicant: PanopticAI Limited, N.T. (HK)

(72) Inventors: Jing Wei Chin, N.T. (HK); Tsz Tai Chan, Kowloon (HK); Kristian Suhartono, Kowloon (HK)

(73) Assignee: PanopticAI Limited, N.T. (HK)

( * ) Notice: Subject to any disclaimer, the term of this patent is extended or adjusted under 35 U.S.C. 154(b) by 326 days.

(21) Appl. No.: 18/548,686

(22) PCT Filed: Sep. 21, 2022

(86) PCT No.: PCT/CN2022/120367
§ 371 (c)(1),
(2) Date: Sep. 1, 2023

(87) PCT Pub. No.: WO2023/178957
PCT Pub. Date: Sep. 28, 2023

(65) Prior Publication Data
US 2025/0022311 A1 Jan. 16, 2025

Related U.S. Application Data

(60) Provisional application No. 63/269,861, filed on Mar. 24, 2022.

(51) Int. Cl.
*G06V 40/10* (2022.01)
*G06V 10/25* (2022.01)
(Continued)

(52) U.S. Cl.
CPC ............... *G06V 40/15* (2022.01); *G06V 10/25* (2022.01); *G06V 40/162* (2022.01);
(Continued)

(58) Field of Classification Search
None
See application file for complete search history.

(56) References Cited

U.S. PATENT DOCUMENTS

| 2019/0034713 | A1  | 1/2019 | Fraz et al. |
| 2019/0046057 | A1* | 2/2019 | Lai ................... A61B 5/7203 |
| 2024/0127948 | A1* | 4/2024 | Baba .................. G16H 50/20 |

FOREIGN PATENT DOCUMENTS

| CN | 108135487 A | 6/2018 |
| CN | 110367950 A | 10/2019 |

(Continued)

OTHER PUBLICATIONS

International Search Report of PCT/CN2022/120367.

*Primary Examiner* — Dov Popovici

(57) ABSTRACT

A vital signs monitoring method, devices related thereto, and a computer-readable storage medium is provided. The method is applied to a vital signs monitoring device which includes an image acquisition unit, a feature extraction unit, and a processing unit connected in sequence. The method may include the steps of: acquiring, through the image acquisition unit, a first face image which is at least one frame of breathe-in-breathe-out actions of a user; processing the first face image through the feature extraction unit to obtain vital signs data of the user; and processing the vital signs data of the user through the processing unit to obtain health conditions of the user. Implementation of the application can conveniently measure vital signs of the user without special monitoring devices, which is convenient to know their own health conditions in real time and can prevent occurrence of sudden diseases to a certain extent.

9 Claims, 8 Drawing Sheets

(51) Int. Cl.
  *G06V 40/16* (2022.01)
  *G16H 15/00* (2018.01)
  *G16H 50/30* (2018.01)

(52) U.S. Cl.
  CPC .......... *G06V 40/171* (2022.01); *G16H 15/00* (2018.01); *G16H 50/30* (2018.01)

(56) References Cited

FOREIGN PATENT DOCUMENTS

| | | | |
|---|---|---|---|
| CN | 110384491 A | 10/2019 | |
| JP | 2022035305 A | 3/2022 | |

\* cited by examiner

S101: Acquire, through an image acquisition unit, a first face image which is at least one frame of breathe-in-breathe-out actions of a user S102: Process the first face image through a feature extraction unit to obtain vital signs data of the user S103: Process the vital signs data of the user through the processing unit to obtain health conditions of the user S104: Display the health conditions of the user in the form of a chart or a curve through a display unit

Fig. 2

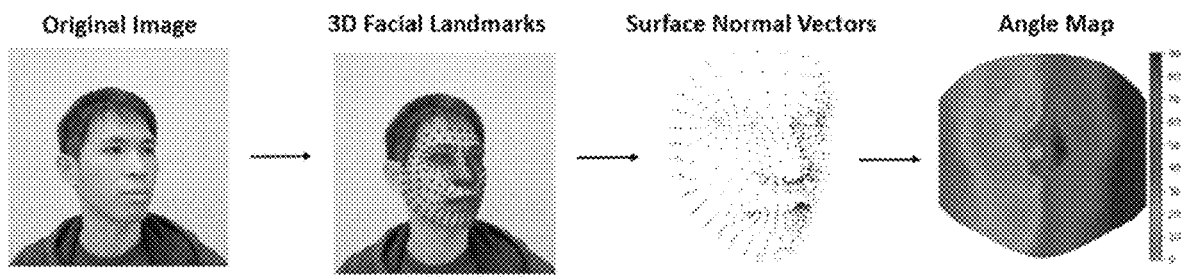

Fig. 3

S101: Acquire, through an image acquisition unit, a first face image which is at least one frame of breathe-in-breathe-out actions of a user S102: Process the first face image through a feature extraction unit to obtain vital signs data of the user S103: Process the vital signs data of the user through a processing unit to obtain health conditions of the user S105: Output, through the processing unit, one or more health recommendations according to the health conditions or a health condition history of the user

Fig. 8a

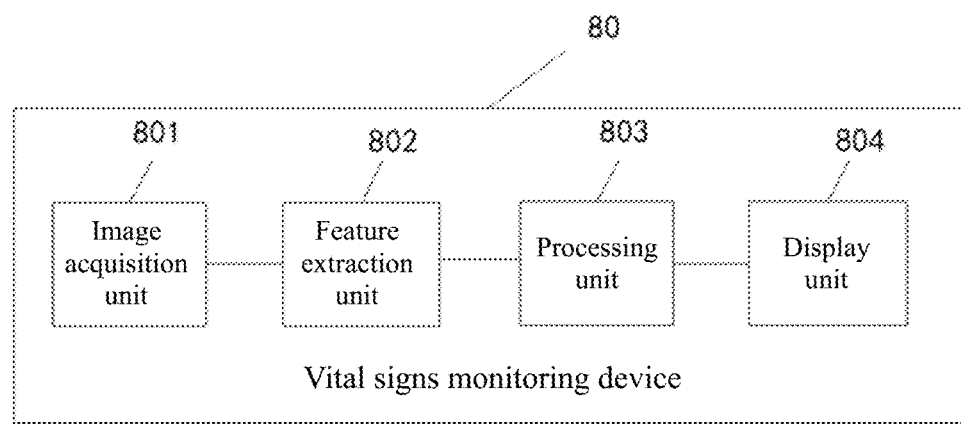

Fig. 8b

VITAL SIGNS MONITORING METHOD, DEVICES RELATED THERETO AND COMPUTER-READABLE STORAGE MEDIUM

TECHNICAL FIELD

The present application relates to the technical field of vital signs monitoring, in particular to a vital signs monitoring method, devices related thereto, and a computer-readable storage medium.

BACKGROUND

With continuous progress of society, people's living standards are constantly improving, and the medical system is also constantly improving. The medical system is more and more humanized, and people are no longer satisfied with hospital treatment, but start to require real-time monitoring of physical conditions at home. At present, vital signs monitoring is of great significance to people's work, study and health. Especially for people with hidden health issues, real-time monitoring of vital signs as a precaution against future health threats are of even greater significance.

Typically, monitoring of vital signs depends on authoritative devices or monitoring devices in hospitals. Most of the vital signs monitoring devices are prepared for patients, which are generally large in size, inconvenient to carry, or expensive and inconvenient to use frequently, etc. Although, with continuous updating of technologies, many household vital signs monitoring devices or portable vital signs monitoring devices have appeared, a wearer/user still has to go to a hospital to ask practitioners for assistance in checking collected vital signs data so that corresponding treatment guidance can be provided by the practitioners, that is, such monitoring devices cannot give early warning of abnormal physical conditions independently. Therefore, how to monitor vital signs of oneself conveniently is an urgent technical problem to be solved.

SUMMARY

An embodiment of the present application provides a vital signs monitoring method, devices related thereto and a computer-readable storage medium, which can conveniently measure vital signs of a user without special measuring devices.

In accordance with a first aspect, an embodiment of the present application provides a vital signs monitoring method applied to a vital signs monitoring device which includes an image acquisition unit, a feature extraction unit, and a processing unit connected in sequence. The method may include the steps of:
  acquiring, through the image acquisition unit, a first face image which is at least one frame of breathe-in-breathe-out actions of a user;
  processing the first face image through the feature extraction unit to obtain vital signs data of the user; and
  processing the vital signs data of the user through the processing unit to obtain health conditions of the user.

To implement the embodiment of the present application, the vital signs monitoring device may: acquire, through the image acquisition unit, a first face image of breathe-in-breathe-out actions of a user; then, process the first face image through the feature extraction unit to obtain vital signs data of the user; and finally, process the vital signs data of the user through the processing unit to obtain health conditions of the user. In this way, vital signs of the user can be measured conveniently without special monitoring devices, which helps the user to know their own health conditions in real time and can prevent occurrence of sudden diseases to a certain extent.

In a possible implementation, the vital signs monitoring device further includes a display unit connected to the processing unit; and the method further includes:
  displaying the health conditions of the user in the form of a chart or a curve through the display unit.

In a possible implementation, processing the first face image through the feature extraction unit to obtain vital signs data of the user includes:
  extracting a region of interest (ROI) from the first face image;
  masking the ROI to eliminate pixels containing noise or pixels with no obvious photoplethysmography (PPG) signal in the first face image to obtain a second face image; and
  extracting the vital signs data of the user from the second face image.

In a possible implementation, after masking the ROI to eliminate the pixels containing noise or the pixels with no obvious PPG signal in the first face image to obtain the second face image, the method further includes:
  enhancing PPG signals contained in the second face image through a signal enhancement algorithm to obtain a third face image; and
  extracting the vital signs data of the user from the second face image includes:
  extracting the vital signs data of the user from the third face image.

In a possible implementation, the method further includes:
  outputting one or more health recommendations according to the health conditions or a health condition history of the user through the processing unit.

In a possible implementation, outputting the one or more health recommendations according to the health conditions of the user includes:
  in response to the health conditions belonging to a first level of abnormality, outputting first early warning information to warn the user to contact healthcare professionals for treatment immediately; or,
  in response to the health conditions not belonging to the first level of abnormality, outputting the one or more health recommendations based on the health conditions that manifests the abnormality.

In a possible implementation, the vital signs data of the user includes at least one of heart rate, heart rate variability analysis, blood oxygen saturation, stress, blood pressure, breathing rate, and temperature.

In accordance with a second aspect, an embodiment of the present application provides a vital signs monitoring system applied to a vital signs monitoring device. The vital signs monitoring device includes an image acquisition unit, a feature extraction unit, and a processing unit connected in sequence, wherein
  the image acquisition unit is configured to acquire a first face image which is at least one frame of breathe-in-breathe-out actions of a user;
  the feature extraction unit is configured to process the first face image to obtain vital signs data of the user; and
  the processing unit is configured to process the vital signs data of the user to obtain health conditions of the user.

In a possible implementation, the vital signs monitoring device further includes a display unit connected to the processing unit, wherein
    the display unit is configured to display the health conditions of the user in the form of a chart or a curve.

In a possible implementation, the feature extraction unit includes a first extraction unit, a masking unit, and a second extraction unit, wherein
    the first extraction unit is configured to extract an ROI from the first face image;
    the masking unit is configured to mask the ROI to eliminate pixels containing noise or pixels with no obvious PPG signal in the first face image to obtain a second face image; and
    the second extraction unit is configured to extract the vital signs data of the user from the second face image.

In a possible implementation, the feature extraction unit further includes a signal enhancement unit configured to enhance PPG signals contained in the second face image through a signal enhancement algorithm to obtain a third face image; and
    the second extraction unit is specifically configured to:
    extract the vital signs data of the user from the third face image.

In a possible implementation, the processing unit is further configured to:
    output one or more health recommendations according to the health conditions or a health condition history of the user.

In a possible implementation, the processing unit is specifically configured to:
    output first early warning information to warn the user to contact healthcare professionals for treatment immediately, in response to the health conditions belonging to a first level of abnormality; or,
    output the one or more health recommendations based on the health conditions that manifests the abnormality, in response to the health conditions not belonging to the first level of abnormality.

In a possible implementation, the vital signs data of the user includes at least one of heart rate, heart rate variability analysis, blood oxygen saturation, stress, blood pressure, breathing rate, and temperature.

In accordance with a third aspect, an embodiment of the present application provides an electronic device, including a processor and a memory interconnected to each other, wherein the memory is configured to store a computer program including program instructions, and the processor is configured to invoke the program instructions to perform the method of the first aspect described above.

In accordance with a fourth aspect, an embodiment of the present application provides a computer-readable storage medium, which stores a computer program including program instructions that, when executed by a processor, cause the processor to perform the method of the first aspect described above.

In accordance with a fifth aspect, an embodiment of the present application further provides a computer program including program instructions that, when executed by a processor, cause the processor to perform the method of the first aspect described above.

BRIEF DESCRIPTION OF DRAWINGS

In order to more clearly explain the technical schemes of the embodiments of the present application, the drawings needed in the description of the embodiments are briefly set forth below.

FIG. 2 is a flowchart of a vital signs monitoring method according to an embodiment of the present application;

FIG. 3 is a schematic diagram showing facial image processing according to an embodiment of the present application;

FIG. 8a is a flowchart of another vital signs monitoring method according to an embodiment of the present application;

FIG. 8b is a schematic diagram of a vital signs monitoring device according to an embodiment of the present application.

DETAILED DESCRIPTION

The technical schemes in the embodiments of the present application will be described below with reference to the drawings of the embodiments of the present application.

Typically, monitoring of vital signs relies on authoritative devices or expensive and bulky monitoring devices in hospitals; moreover, most of the vital signs monitoring devices are prepared for patients, which are generally large in size, inconvenient to carry, or expensive and inconvenient to use frequently, etc. Although, with continuous updating of technologies, many household vital signs monitoring devices or wearable vital signs monitoring devices have appeared, as the current vital signs monitoring devices only collect real-time vital signs data of a wearer/user, the wearer/user has to go to a hospital to ask a practitioner for assistance in checking collected vital signs data before the practitioner can give corresponding treatment guidance, that is, such devices cannot give early warning of abnormal physical conditions independently. Based on this, the present application provides a vital signs monitoring method, devices related thereto, and a computer-readable storage medium, aiming at solving the above-mentioned technical problems in the prior art.

Hereinafter, the technical schemes of the present application and how the technical schemes of the present application solve the above technical problems are described in detail with specific implementations. It should be noted that for the convenience of illustration, the following specific embodiments may be combined with each other and identical or similar concepts or processes may not be repeated in some embodiments.

The vital signs monitoring method according to the present application will be described in detail hereinafter with reference to the accompanying drawings.

Figure 1:
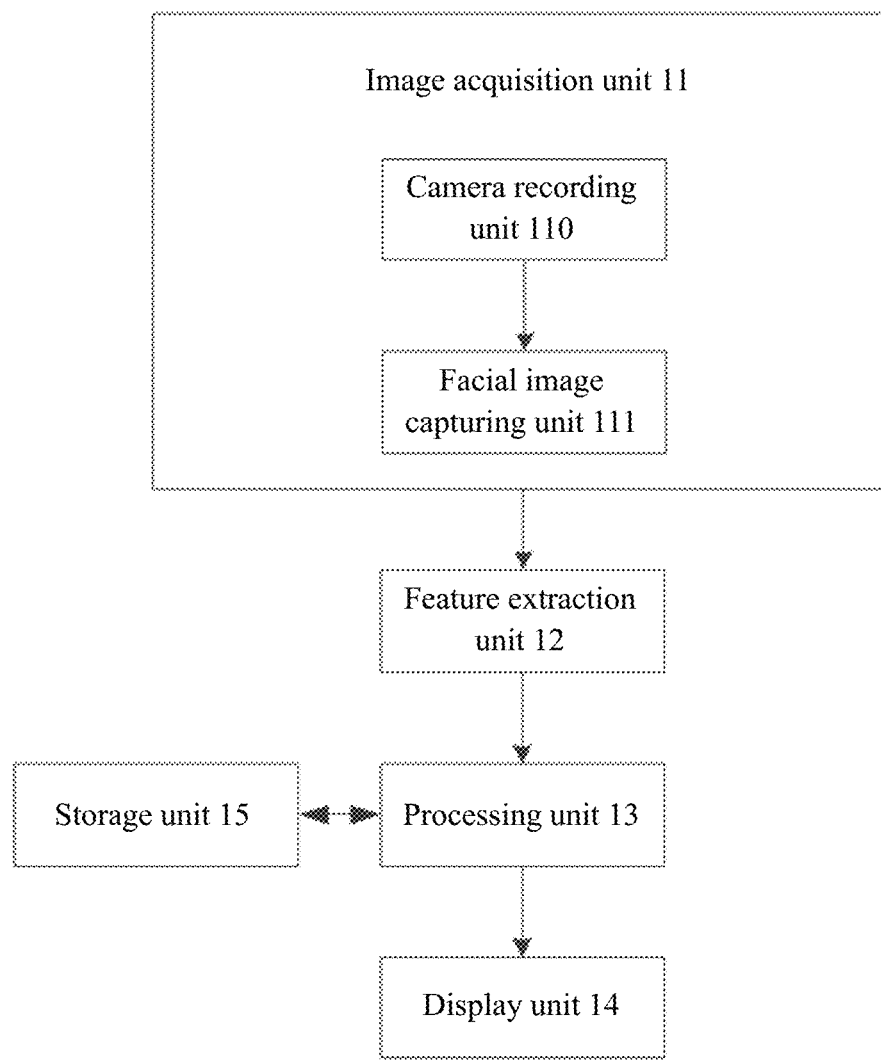
FIG. 1 is a schematic diagram of a vital signs monitoring device according to an embodiment of the present application.

FIG. 1 shows a schematic diagram of a vital signs monitoring device 10 according to an embodiment of the present application, which includes an image acquisition unit 11, a feature extraction unit 12, a processing unit 13, a display unit 14 and a storage unit 15. Here, the image acquisition unit 11 may include a camera recording unit 110 and a facial image capturing unit 111.

Taking the vital signs monitoring device shown in FIG. 1 as an example, the vital signs monitoring method proposed in the present application as shown in FIG. 2 may include, but is not limited to, the following steps.

At S101, a first face image is acquired through the image acquisition unit, the first face image being at least one frame of breathe-in-breathe-out actions of a user.

In an embodiment of the present application, the camera recording unit 110 records color images of the breathe-in-breathe-out actions performed by the user over a short period of time in accordance with a breathe-in-breathe-out guide. Here, the color images of the breathe-in-breathe-out actions may be a plurality of image frames taken continuously over a period of time. Then, each of the color images acquired by the camera is processed by the facial image capturing unit 111 using a machine learning model (for example a face recognition model) to determine a position of a face included in the color image. Then, the acquired face position is used to create an image patch of a complete face image corresponding to a person.

Considering that not all the color images acquired by the image acquisition unit 11 are intended for feature extraction, the acquired color images may be screened before feature extraction to obtain color images including PPG signals. In this way, influences of noise on the PPG signals can be minimized, and accuracy of vital signs monitoring can be greatly improved.

At S102, the first face image is processed through the feature extraction unit to obtain vital signs data of the user.

In some embodiments, the implementation of processing the first face image through the feature extraction unit to obtain the vital signs data of the user may include: extracting an ROI from the first face image, wherein the ROI includes pixels with PPG signals; then, masking the ROI to eliminate pixels containing noise or pixels with no obvious PPG signal in the first face image to obtain a second face image; and finally, extracting the vital signs data of the user from the second face image.

Figure 4:
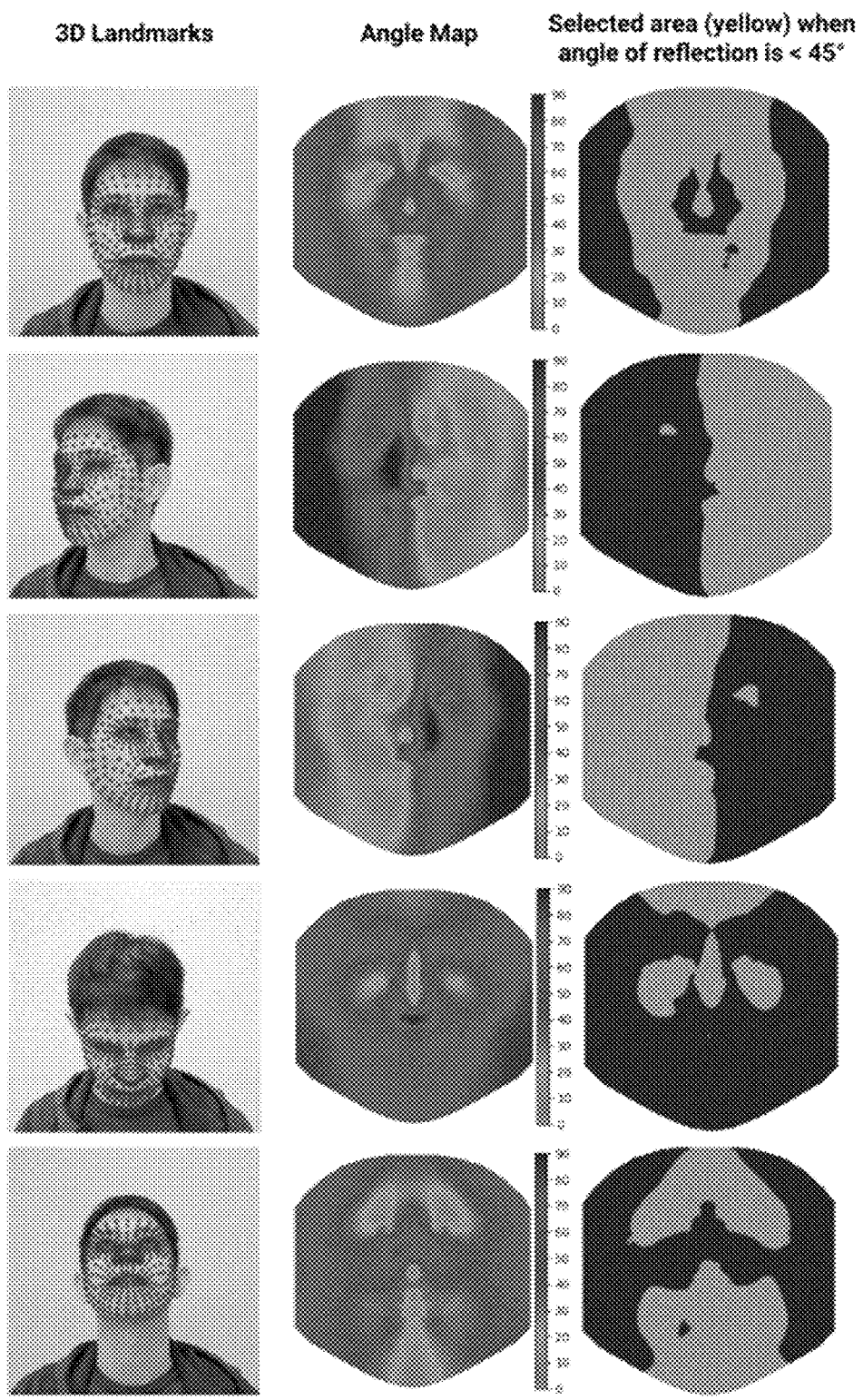
FIG. 4 is another schematic diagram showing facial image processing according to an embodiment of the present application.
Figure 5:
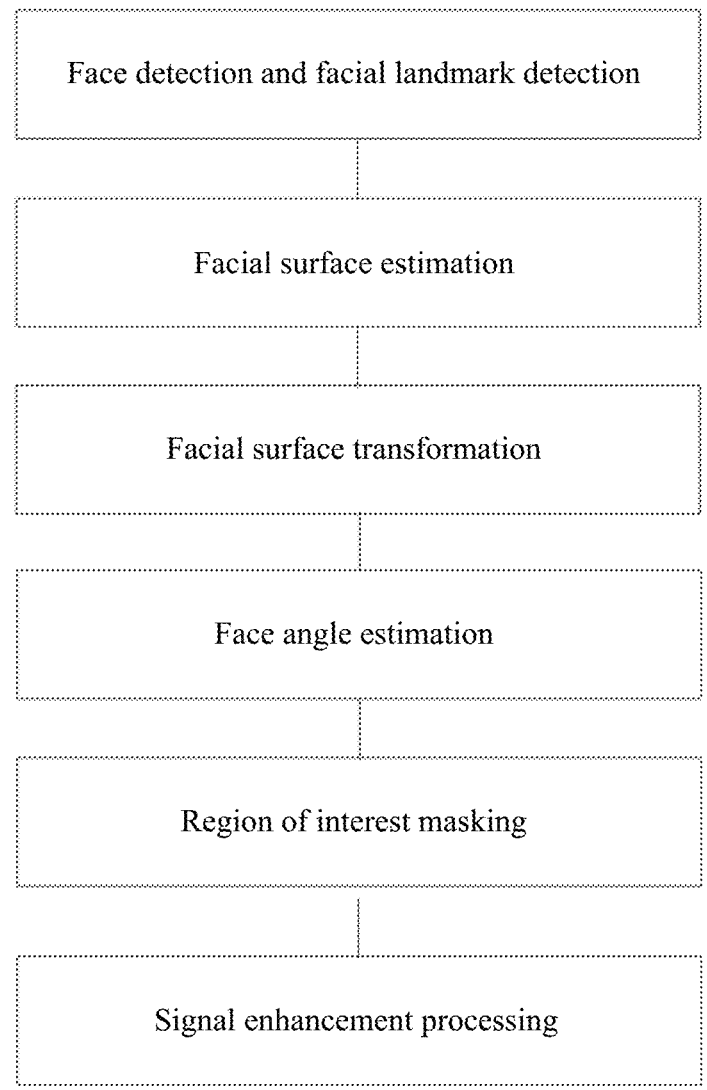
FIG. 5 is a flowchart of a facial image processing method according to an embodiment of the present application.

In practical application, the ROI can be identified using computer vision algorithms to estimate facial features of the person, which may be landmarks of a facial structure (such as eyes, nose, mouth, etc.). The landmarks are used as reference points to estimate angles between the landmarks and the camera. By calculating a surface normal at each of the landmarks, an angle difference between the surface normal and a camera orientation is then calculated. Then, face surface transformation is performed to map the angle of each of the landmarks onto a 2D map and fill pixels between the landmarks, and extrapolation is performed. Thus, the generated 2D map can be used to estimate a mask representing an area of a human face containing the PPG signals that has higher salience due to its visibility to the camera. A specific implementation may be as shown in FIG. 3, and result changes that occur during execution may be as shown in FIG. 4. Then, the ROI extracted from the first face image (i.e., an original face image) is masked by Boolean operation using the obtained mask to eliminate pixels containing noise or pixels with no obvious PPG signal in the first face image to obtain a second face image. Thus, the vital signs data of the user can be extracted from the second face image. In some embodiments, after obtaining the second face image, PPG signals contained in the second face image can be enhanced through a signal enhancement algorithm to obtain a third face image, so that the vital signs data of the user can be extracted from the third face image. A specific implementation is be shown in FIG. 5. In practical application, signal enhancement processing needs some facial features or facial feature changes over a period of time.

In an embodiment of the present application, the vital signs data of the user includes at least one of heart rate, heart rate variability analysis, blood oxygen saturation, stress, blood pressure, breathing rate, and temperature.

At S103, the vital signs data of the user is processed through the processing unit to obtain health conditions of the user.

Understandably, the health conditions of the user can be used to determine a risk of the user in developing a certain disease. In practical application, the vital signs data of the user can be processed by a machine learning model, and a risk of a user in developing a certain disease can be obtained. In some embodiments, a machine learning model can be used to analyze given vital signs data and improve the accuracy of estimating the risk of the user in developing a certain disease so as to minimize any possible errors. Then, a health report of the user is generated.

At S104, the health conditions of the user are displayed in the form of a chart or a curve through the display unit.

Figure 6:
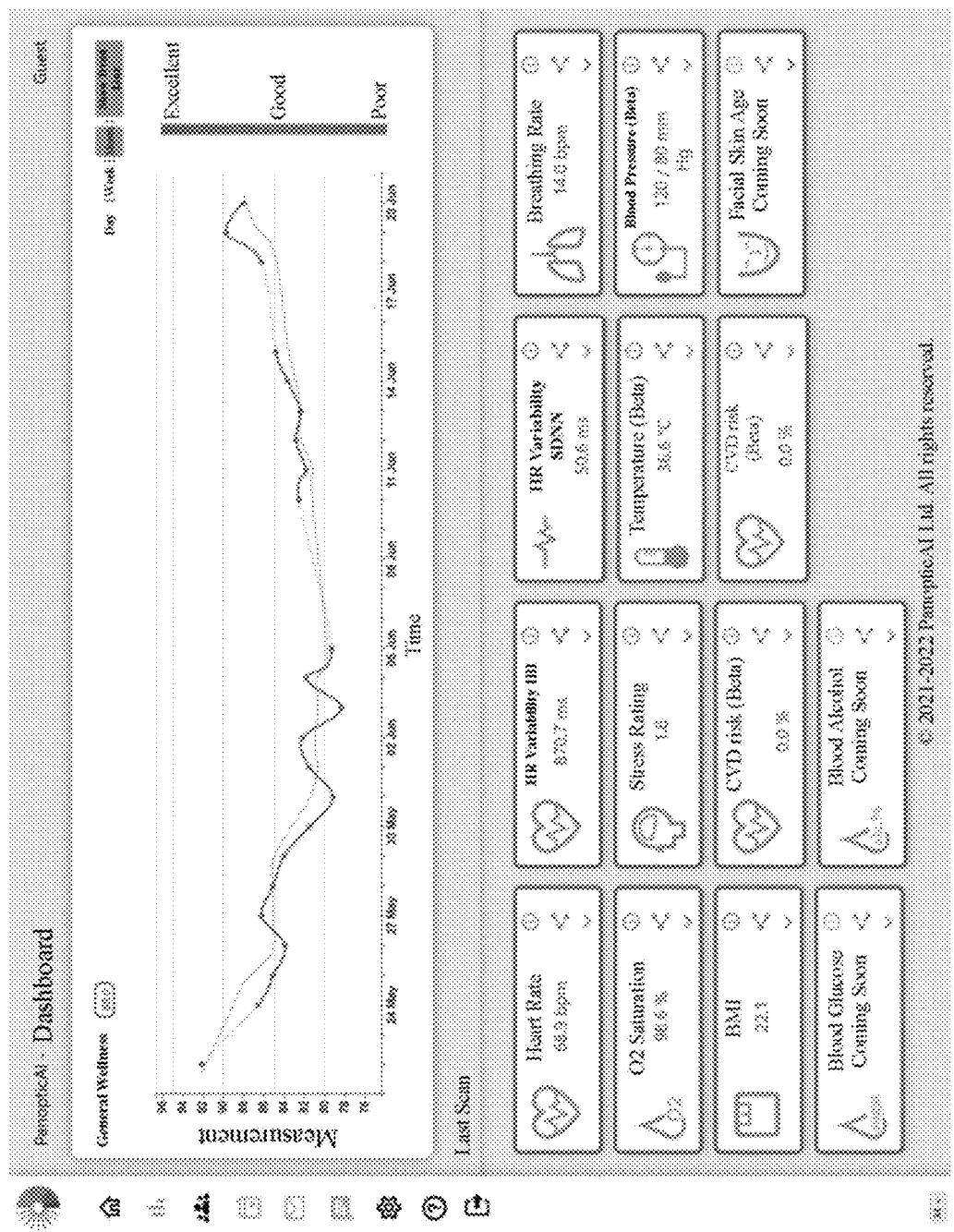
FIG. 6 is a schematic view of an interface displaying health conditions according to an embodiment of the present application.

For example, a health report of the user displayed through the display unit 14 may be as shown in FIG. 6.

Figure 7:
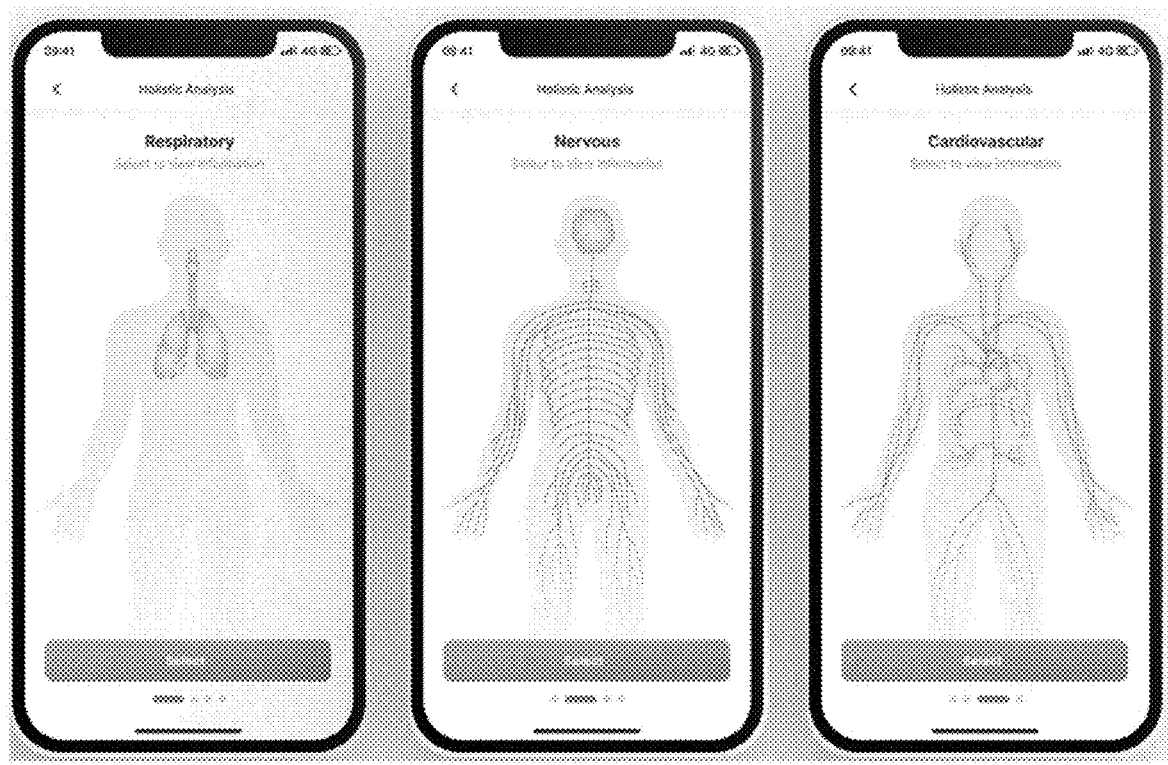
FIG. 7 is a schematic view of another interface displaying health conditions according to an embodiment of the present application.

For example, as shown in FIG. 7, the health report can be displayed based on different functional systems of a human body.

In some embodiments, as shown in FIG. 8*a*, after step S103 is performed, step S105 may also be performed, which will be described in detail below:

at S105, one or more health recommendations are output according to the health conditions or a health condition history of the user through the processing unit.

In some embodiments, outputting the one or more health recommendations according to the health conditions of the user includes:

in response to the health conditions belonging to a first level of abnormality, outputting first early warning information to warn the user to contact healthcare professionals for treatment immediately; or, in response to the health conditions not belonging to the first level of abnormality, outputting the one or more health recommendations based on the health conditions that manifests the abnormality.

According to the embodiment of the present application, by analyzing the vital signs data, abnormal vital signs data and a level of abnormality can be accurately determined, and the user can decide on their own to seek medical advice from a practitioner according to the level of abnormality, thus effectively preventing late and delayed medical treatment for physical abnormality.

After that, the one or more health recommendations can be output through the display unit 14.

In some embodiments, the vital signs monitoring device may receive a feedback result input by the user for the health conditions and thereafter store the health conditions of the user and the feedback result input by the user in the storage unit 15. Further, the storage unit 15 may store history data of the user and the processing unit 13 may use an optimization algorithm for the historical data of the user to output more targeted health recommendations.

In general, the vital signs monitoring device can acquire, through the image acquisition unit, a first face image of breathe-in-breathe-out actions of a user; then, process the first face image through the feature extraction unit to obtain vital signs data of the user; and finally, process the vital signs data of the user through the processing unit to obtain health conditions of the user. In this way, vital signs of the user can be measured conveniently without special monitoring devices, which helps the user to know their own health conditions in real time and can prevent occurrence of sudden diseases to a certain extent.

In order to better implement the method of the embodiment of the present application, a further embodiment of the application depicts a schematic diagram of a vital signs monitoring device of the same inventive concept as the method embodiment of FIG. 2. As shown in FIG. 8b, the vital signs monitoring device may include an image acquisition unit 801, a feature extraction unit 802, and a processing unit 803 connected in sequence.

The image acquisition unit 801 is configured to acquire a first face image which is at least one frame of breathe-in-breathe-out actions of a user.

The feature extraction unit 802 is configured to process the first face image to obtain vital signs data of the user.

The processing unit 803 is configured to process the vital signs data of the user to obtain health conditions of the user.

In a possible implementation, the vital signs monitoring device further includes a display unit 804 connected to the processing unit.

The display unit 804 is configured to display the health conditions of the user in the form of a chart or a curve.

In a possible implementation, the feature extraction unit 802 includes a first extraction unit, a masking unit, and a second extraction unit.

The first extraction unit is configured to extract an ROI from the first face image;
the masking unit is configured to mask the ROI to eliminate pixels containing noise or pixels with no obvious PPG signal in the first face image to obtain a second face image; and
the second extraction unit is configured to extract the vital signs data of the user from the second face image.

In a possible implementation, the feature extraction unit 802 further includes a signal enhancement unit configured to enhance PPG signals contained in the second face image through a signal enhancement algorithm to obtain a third face image; and
the second extraction unit is specifically configured to:
extract the vital signs data of the user from the third face image.

In a possible implementation, the processing unit 803 is further configured to:
output one or more health recommendations according to the health conditions or a health condition history of the user.

In a possible implementation, the processing unit 803 is specifically configured to:
output first early warning information to warn the user to contact healthcare professionals for treatment immediately, in response to the health conditions belonging to a first level of abnormality; or,
output the one or more health recommendations based on the health conditions that manifests the abnormality, in response to the health conditions not belonging to the first level of abnormality.

In a possible implementation, the vital signs data of the user includes at least one of heart rate, heart rate variability analysis, blood oxygen saturation, stress, blood pressure, breathing rate, and temperature.

It can be understood that functions of the functional units of the vital signs monitoring device of this embodiment can be specifically implemented according to the method in the method embodiment shown in FIG. 2. For the specific implementation process, please refer to relevant description of the method embodiment, and details are not to be given here.

In order to better implement the above schemes of the embodiments of the present application, the present application also correspondingly provides another electronic device, which will be described in detail with reference to the accompanying drawings.

Figure 9:
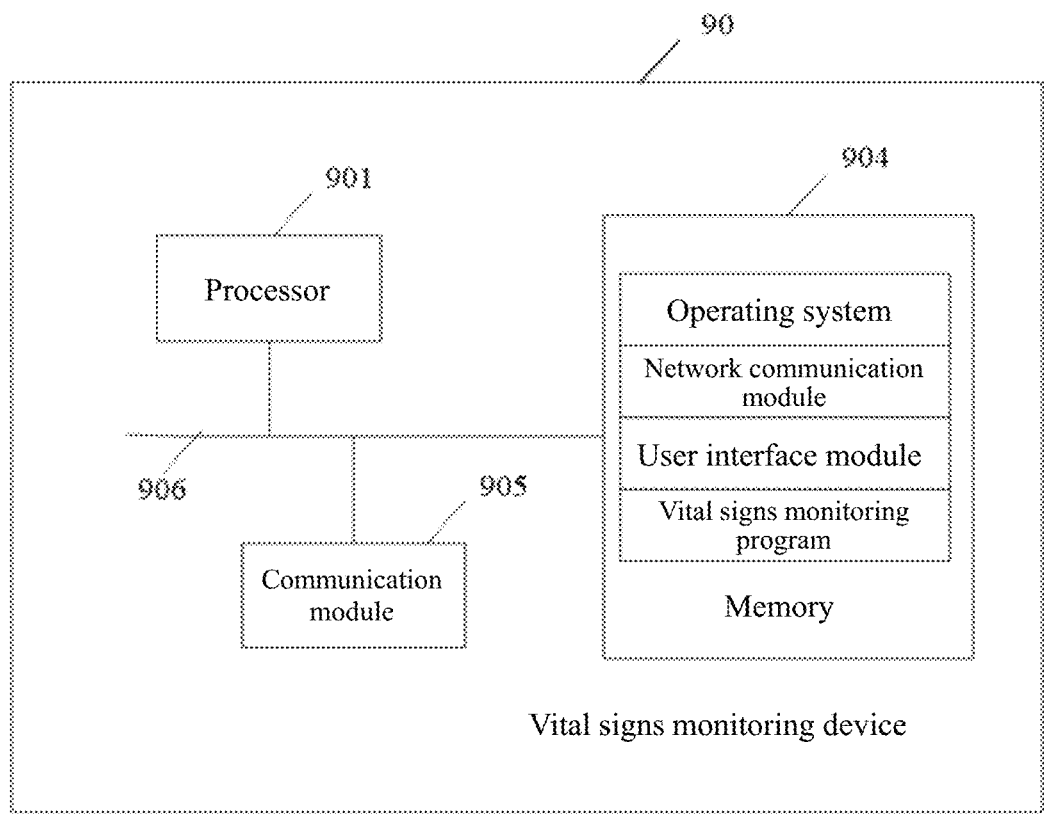
FIG. 9 is a schematic diagram of an electronic device according to an embodiment of the present application.

FIG. 9 shows a schematic diagram of an electronic device according to an embodiment of the present application. The electronic device 90 may include a processor 901, a memory 904, and a communication module 905. The processor 901, the memory 904, and the communication module 905 may be interconnected via a bus 906. Further, the electronic device 90 may be provided with a camera to acquire a face image of breathe-in-breathe-out actions of a user. The memory 904 may be a high-speed random access memory (RAM) or a non-volatile memory such as at least one disk memory. The memory 904 may alternatively be at least one storage system located remotely from the aforementioned processor 901. The memory 904 is configured to store application program codes, which may include an operating system, a network communication module, a user interface module, and a data processing program; and the communication module 905 is used for information interaction with external devices. The processor 901 is configured to invoke the program codes to perform the steps of:
acquiring a first face image which is at least one frame of breathe-in-breathe-out actions of a user;
processing the first face image to obtain vital signs data of the user; and
processing the vital signs data of the user to obtain health conditions of the user.

Here, the processor 901 is further configured to:
display health conditions of the user in the form of a chart or curve.

Here, processing the first face image to obtain the vital signs data of the user through the processor 901 includes:
extracting an (ROI from the first face image;
masking the ROI to eliminate pixels containing noise or pixels with no obvious PPG signal in the first face image to obtain a second face image; and
extracting the vital signs data of the user from the second face image.

Here, after masking the ROI through the processor 901 to eliminate the pixels containing noise or the pixels with no obvious PPG signal in the first face image to obtain the second face image, the method further includes:
enhancing PPG signals contained in the second face image through a signal enhancement algorithm to obtain a third face image; and
extracting the vital signs data of the user from the second face image includes:
extracting the vital signs data of the user from the third face image.

Here, the processor 901 is further configured to:
output one or more health recommendations according to the health conditions or a health condition history of the user.

Here, outputting the one or more health recommendations according to the health conditions of the user through the processor 901 includes:
in response to the health conditions belonging to a first level of abnormality, outputting first early warning information to warn the user to contact healthcare professionals for treatment immediately; or, in response to the health conditions not belonging to the first level of abnormality, outputting the one or more health recommendations based on the health conditions that manifests the abnormality.

Here, the vital signs data of the user includes at least one of heart rate, heart rate variability analysis, blood oxygen saturation, stress, blood pressure, breathing rate, and temperature.

It should be noted that, for the execution steps of the processor in the electronic device 90 in this embodiment of the present application, reference can be made to the specific implementation of the operation of the vital signs monitoring device in the embodiment of FIG. 2 in the abovementioned method embodiments, and the details will not be repeated here.

It should be understood that the application scenarios to which the method according to the embodiments of the present application may be applicable are provided by way of example only and are not limited thereto in practical applications.

It should also be understood that the terms "first", "second", "third", and various numeral numbers referred to in the present application are merely descriptive for convenient distinctions and are not intended to limit the scope of the present application.

It should be understood that the term "and/or" used in the present application is merely an association relationship that describes associated objects, and represents that there may be three kinds of relationships. For example, A and/or B may represent three cases: only A exists, both A and B exist, and only B exists. In addition, the slash "/" used in the present application generally indicates that associated objects are in an "or" relationship.

In addition, in each embodiment of the present application, the size of the reference numerals of the abovementioned processes does not mean the sequence of execution, and the execution sequence of the processes should be determined by their functions and internal logics, and should not constitute any limitation on the implementation process of the embodiments of the present application.

Those of ordinary skill in the art can realize that the units and steps of the method of each example described in connection with the embodiments disclosed herein can be implemented in electronic hardware, or a combination of computer software and electronic hardware. Whether these functions are implemented in hardware or software depends on the specific application and design constraints of the technical schemes. Specialized technicians can use different methods to implement the described functions for each specific application, but such implementations should not be considered beyond the scope of the present application.

Those skilled in the art can clearly understand that, for the convenience and conciseness of description, only the above division of the functional modules is given as an example. In practical application, the above functions can be distributed to and performed by different functional modules as required, that is, the internal structure of the device is divided into different functional modules to perform all or some of the functions described above.

In the embodiments provided by the present application, it should be understood that the disclosed device and method can be realized in alternative ways. For example, the device embodiments described above are only for illustration. For example, the division of the modules and units is only a logic function division. In actual implementation, there may be alternative manners for the division, for example, multiple units or components may be combined or integrated into another system, or some features may be omitted or not implemented.

The units described as separate components may or may not be physically separated, and the components displayed as units may or may not be physical units, that is, they may be located in one place or distributed to multiple network units. Some or all of the units can be selected according to actual needs to achieve the purpose of the embodiments of the present application.

In addition, the functional units involved in each embodiment of the present application may be integrated into one processing unit, or each unit may physically exist separately, or two or more units may be integrated into one unit. The integration unit can be realized either in the form of hardware or in the form of a software functional unit, which is not limited in the present application.

An embodiment of the present invention further provides a computer-readable storage medium which stores instructions that, when executed by a computer or processor, cause the computer or processor to perform one or more steps of the method of any of the above embodiments. If component modules of the device are implemented in the form of functional units of software and sold or used as independent products, they can be stored in a computer-readable storage medium. On the basis of this understanding, the substance or the parts that contribute to the existing technology or all or some of the technical schemes of the present application may be embodied in the form of a software product, which may be stored in a computer-readable storage medium.

The computer-readable storage medium may be an internal storage unit of the server described in the above embodiments, such as a hard disk or memory. The computer-readable storage medium may also be an external storage device of the server, such as a plug-in hard disk, a smart media card (SMC), a secure digital (SD) card, a flash card, etc. Further, the above-mentioned computer-readable storage medium may also include both an internal storage unit and an external storage device of the server. The computer-readable storage medium is configured to store the above-described computer program and other programs and data required by the server. The computer-readable storage medium may also be used to temporarily store data that has been outputted or is to be outputted.

Those of ordinary skill in the art will appreciate that all or part of the flow of implementing the methods of the above-described embodiments may be accomplished by instructing the associated hardware through a computer program that may be stored in a computer-readable storage medium and, when executed, may implement the flow of the embodiments of the above-described methods. The aforementioned storage medium includes: ROM, RAM, magnetic disk or optical disk and other mediums that can store program codes.

The steps of the methods in the embodiments of the present application may be sequentially adjusted, combined, and omitted according to actual needs.

The modules in the device of the embodiments of the present application can be combined, divided, and omitted according to actual needs.

The above embodiments are only used to illustrate the technical schemes of the present application and are not intended to limit the present application. Although the present application has been described in detail with reference to the foregoing embodiments, those of ordinary skill in the art will understand that modifications can be made to the technical schemes described in the aforementioned embodiments, or equivalent replacements can be made to some of the technical features in the embodiments; and these modifications or replacements do not make the essence of the corresponding technical schemes deviate from the scope of the technical schemes of the embodiments of the present application.

The invention claimed is:

1. A vital signs monitoring method, wherein the method is applied to a vital signs monitoring device which comprises an image acquisition unit, a feature extraction unit, and a processing unit connected in sequence, and the method comprises:
   acquiring, through the image acquisition unit, a first face image which is at least one frame of breathe-in-breathe-out actions of a user;
   processing the first face image through the feature extraction unit to obtain vital signs data of the user; and
   processing the vital signs data of the user through the processing unit to obtain health conditions of the user;
   wherein processing the first face image through the feature extraction unit to obtain the vital signs data of the user comprises:
   extracting a region of interest (ROI) from the first face image;
   masking the ROI to eliminate pixels containing noise or pixels with no obvious photoplethysmography (PPG) signal in the first face image to obtain a second face image; and
   extracting the vital signs data of the user from the second face image.

2. The method of claim 1, wherein the vital signs monitoring device further comprises a display unit connected to the processing unit; and the method further comprises:
   displaying the health conditions of the user in the form of a chart or a curve through the display unit.

3. The method of claim 1, wherein after masking the ROI to eliminate the pixels containing noise or the pixels with no obvious PPG signal in the first face image to obtain the second face image, the method further comprises:
   enhancing PPG signals contained in the second face image through a signal enhancement algorithm to obtain a third face image; and
   extracting the vital signs data of the user from the second face image comprises:
   extracting the vital signs data of the user from the third face image.

4. The method of claim 1, further comprising:
   outputting one or more health recommendations according to the health conditions or a health condition history of the user through the processing unit.

5. The method of claim 4, wherein outputting the one or more health recommendations according to the health conditions of the user comprises:
   in response to the health conditions belonging to a first level of abnormality, outputting first early warning information to warn the user to contact healthcare professionals for treatment immediately; or,
   in response to the health conditions not belonging to the first level of abnormality, outputting the one or more health recommendations based on the health conditions that manifests the abnormality.

6. The method of claim 1, wherein the vital signs data of the user comprises at least one of heart rate, heart rate variability analysis, blood oxygen saturation, stress, blood pressure, breathing rate, and temperature.

7. An electronic device, comprising a processor and a memory interconnected to each other, wherein the memory is configured to store a computer program comprising program instructions, and the processor is configured to invoke the program instructions to perform the method of claim 1.

8. A non-transitory computer-readable storage medium, which stores a computer program comprising program instructions that, when executed by a processor, cause the processor to perform the method of claim 1.

9. A vital signs monitoring system, wherein the system is applied to a vital signs monitoring device which comprises an image acquisition unit, a feature extraction unit, and a processing unit connected in sequence, wherein
   the image acquisition unit is configured to acquire a first face image which is at least one frame of breathe-in-breathe-out actions of a user;
   the feature extraction unit is configured to process the first face image to obtain vital signs data of the user; and
   the processing unit is configured to process the vital signs data of the user to obtain health conditions of the user;
   wherein the feature extraction unit is configured to process following steps:
   extracting a region of interest (ROI) from the first face image;
   masking the ROI to eliminate pixels containing noise or pixels with no obvious photoplethysmography (PPG) signal in the first face image to obtain a second face image; and
   extracting the vital signs data of the user from the second face image.

* * * * *